United States Patent Office 2,954,413
Patented Sept. 27, 1960

2,954,413

CRACKING OF 1.1-DIARYLETHANES

Hugo Kroeper, Heidelberg, and Rolf Platz, Mannheim, Germany, assignors to Badische Anilin- & Soda-Fabrik Aktiengesellschaft, Ludwigshafen (Rhine), Germany No Drawing. Filed Jan. 29, 1957, Ser. No. 636,882

Claims priority, application Germany Feb. 1, 1956

6 Claims. (Cl. 260—669)

This invention relates to a process for the cracking of 1.1-diarylethanes; in particular the invention relates to a process for the catalytic cracking of 1.1-diarylethanes in a fluidized layer under reduced pressure, synthetic silicates being used as cracking catalysts.

It is an object of the invention to obtain nuclear-substituted styrenes.

It is known to convert diarylethanes by catalytic cracking with aluminium oxide, aluminium silicate, chromium oxide or molybdenum oxide on aluminium oxide, with cerium oxide on titanium dioxide or with natural bleaching earths, such as Attapulgus clay or kaolin, into styrenes and alkyl benzenes. In this known method however there are usually formed, by hydrogenation of styrenes, in addition considerable amounts of corresponding ethyl compounds. Attempts have been made to suppress the formation of the ethyl compounds from styrenes by hydrogenation by shortening the contact time with the catalyst and by diluting the diarylethanes with steam. However at least 150 to 200 moles of water per mol of diarylethane are required which corresponds, for example in the cracking of dixylylethane, to 11.5 to 15.5 times the weight of dixylylethane for the water in the form of steam.

We have now found that a considerable shortening of the contact time at the catalyst and a suppression of the undesirable hydrogenation can be achieved without the use of such large amounts of water by carrying out the cracking of the 1.1-diarylethane in a fluidized layer under reduced pressure in a current of steam and by using synthetic silicates as the cracking catalyst. According to this process, 1.1-diarylethanes in general can be cracked to styrenes. As initial materials there are used 1.1-diphenylethane or 1.1-diarylethanes in which the phenyl radicals are substituted by one or more alkyl groups, such as methyl or ethyl radicals.

It is also possible however to crack 1.1-diarylethanes of which the phenyl radicals contain halogen. The corresponding halogen styrenes are then obtained by the cracking. As examples of 1.1-diarylethanes which may be cracked according to this invention there may be mentioned: 1.1-ditolyethane, 1.1-dixylylethane and bis-(2.4-diethylphenyl)-ethane-1.1.

For use in the fluidized layer, catalysts must be chosen which have the necessary resistance to attrition. For example kaolin is not suitable for use as a catalyst in a fluidized layer because by reason of its chalky nature it is subjected to marked attrition and carried out from the reaction chamber in consequence. It is preferred to use synthetic magnesium silicates, but other synthetic silicates, such as the silicates of lithium and of the metals of the 2nd and 3rd groups of the periodic system, as for example lithium, alkali earth and aluminium silicates or mixed silicates of these metals can be used, also with alkali. These synthetic silicates substantially prevent the hydrogenation of styrenes and have the necessary strength for use in fluidized layer processes. For example synthetic silicates are obtained from silica gel by precipitation with magnesium nitrate solution and heating to 500° to 600° C. or by precipitation of a magnesium nitrate solution with waterglass, washing the precipitated magnesium silicate and calcining at 500° C.

The catalysts are introduced into the reaction vessel in a grain size of 0.1 to 3 millimeters, advantageously 0.2 to 0.5 millimeter, and the speed of supply of the gas mixture is adjusted so that the catalyst is maintained in fluidized condition. The catalysts may, however, also be kept in fluidized motion solely by the steam and the diarylethanes to be cracked supplied separately to the reaction vessel, for example by being sprayed directly into the fluidized layer, so that they are protectively vaporized directly in the fluidized layer by the steam under reduced pressure. The vaporization of the diaryl ethanes to be cracked may equally well be carried out in a separate evaporator. The gas which is used for the fluidization of the catalyst may be led for example through a porous clay plate or quartz plate, into the layer of catalyst arranged above the same. It is also possible, however, to use metal plates which are provided with orifices and are arranged one above another in staggered relationship, or a grate.

The process is carried out at temperatures of 350° to 620° C., preferably 400° to 570° C., under reduced pressure, preferably at a pressure of 10 to 150 Torr. Below 10 Torr the space-time yield is bad. Above 150 Torr, the advantage of the use of smaller amounts of water for the cracking is sacrificed to an increasing extent. Cracking under reduced pressure makes it possible to reduce the steam consumption to one tenth. For example if the cracking is carried out at a pressure of 30 Torr, 10 mols of steam are required for each mol of diarylethane, i.e. 1.1 to 1.25 times the amount by weight. It is advantageous to use 4 to 40 mols of steam to 1 mol of diarylethane. The protective vaporization of the diarylethanes in the current of steam under reduced pressure prevents undesirable rearrangements in the initial material.

According to this process it is possible to prepare alkyl styrenes, for example methyl and dimethyl styrenes and styrenes halogenated in the nucleus, which are valuable intermediate products for the production of styrenes which are fast to boiling.

The examples will further illustrate this invention but the invention is not restricted to these examples.

EXAMPLES 1 TO 4

A current of steam produced at 25 to 60 Torr pressure and at 40° to 50° C. is passed through a vessel containing dixylylethane (DXE) which is under the same pressure, the temperature of which is kept at 170° to 190° C. by means of a thermostat. The mixture of dixylylethane and steam thus formed is led into an electrically heated vessel containing at the bottom a perforated plate upon which is situated synthetic magnesium silicate of a grain size of 0.1 to 0.3 millimeter. It is kept at 400° to 550° C. by external heating. The catalyst is kept in fluidized motion by the vapors introduced beneath the perforated plate. The vapors leave the vessel through a cyclone arranged at the upper end, in which entrained catalyst is deposited. From there they pass into a water cooler and a brine cooler. The whole system—steam producer, product evaporator, reaction vessel and coolers—is kept at the desired vacuum with the aid of a vacuum regulator.

The reaction product separating in the receiver of the coolers is worked up by distillation. The results are given in the following table. The content of hydrogenated styrene in the styrene-containing fractions is determined by infrared analysis.

Table

| Example | 1 | 2 | 3 | 4 |
|---|---|---|---|---|
| Pressure behind the fluidized layer in Torr | 25 | 32 | 60 | 75 |
| Temperature in, °C | 570 | 400 | 400 | 520 |
| Supply in kilograms of DXE per liter of catalyst per hour | 0.165 | 0.142 | 0.1219 | 0.434 |
| Mol ratio DXE:$H_2O$ | 1:15 | 1:4.96 | 1:19.5 | 1:8.3 |
| Percentage conversion | 51 | 52 | 54 | 52 |
| Composition of the product: | | | | |
| Percentage of meta-xylene (theoretical=44.6) | 46.8 | 47.5 | 45 | 45 |
| Percentage of 2.4-dimethylstyrene | 49.0 | 43.0 | 47.3 | 52.0 |
| Percentage of hydrogenated dimethylstyrene | 1.4 | 3.2 | 1.2 | 0.8 |
| Percentage of residue | 2.8 | 6.3 | 6.5 | 2.2 |

EXAMPLE 5

Under the same conditions and with the same catalyst as in Examples 1 to 4, there is obtained at 60 Torr and 540° C. from ditolylethane with a throughput of 350 grams of ditolylethane per liter of catalyst per hour and 300 grams of water per liter (mol ratio 1:10) at a conversion of 30% of the theoretical conversion, a reaction product which contains 44.3% of toluene and 50.6% of methylstyrenes in addition to 5% of residue. The mixture of methylstyrenes contains about 35% of ortho-methylstyrene and 65% of para-methylstyrene.

EXAMPLE 6

By using bis-(2.4-diethylphenyl)-ethane-1.1 at a throughput of 410 grams per liter of catalyst per hour and an amount of water of 305 grams (mol ratio 1:12) under the conditions otherwise as specified in Examples 1 to 5, there is obtained with a 50% conversion a reaction product which is composed of 46.2% of diethylbenzene, 50.3% of 2.4-diethylstyrene and 3.4% of residue.

What we claim is:

1. A process for the catalytic cracking of 1,1-diarylethanes which comprises passing a mixture of 1,1-diarylethanes and water vapor through a fluidized catalyst bed consisting of synthetic magnesium silicate, at a temperature of 350° to 620° C. and under a pressure of from 10 to 150 mm. Hg, the said mixture being in a molar ratio of from 4 to 40 mols of water vapor to 1 mol of 1,1-diarylethane.

2. A process in accordance with claim 1 wherein the temperature is in the range of 400° to 570° C.

3. A process in accordance with claim 2 wherein the diarylethane is 1,1 ditolylethane.

4. A process in accordance with claim 2 wherein the diarylethane is 1,1 dixylylethane.

5. A process in accordance with claim 2 wherein the diarylethane is bis-(2,4 diethylphenyl) ethane-1,1.

6. A process in accordance with claim 2 wherein the steam is used for the vaporization of the 1,1 diarylethane.

References Cited in the file of this patent

UNITED STATES PATENTS

| | | |
|---|---|---|
| 2,361,044 | Mattox | Oct. 24, 1944 |
| 2,422,171 | Saunders | June 10, 1947 |

OTHER REFERENCES

Othmer, "Fluidization," Reinhold Publishing Corp., N.Y. (1956) (pages 2 and 3).